Jan. 8, 1963  R. H. OSTERGREN  3,072,794
ROTATING WHEEL SCANNER
Filed Jan. 5, 1954  2 Sheets-Sheet 1

INVENTOR:
Ralph H. Ostergren
By Herbert E. Metcalf
His Patent Attorneys

Jan. 8, 1963  R. H. OSTERGREN  3,072,794
ROTATING WHEEL SCANNER
Filed Jan. 5, 1954  2 Sheets-Sheet 2

INVENTOR:
Ralph H. Ostergren
By Hubert E. Metcalf
His Patent Attorney

United States Patent Office 3,072,794
Patented Jan. 8, 1963

3,072,794
ROTATING WHEEL SCANNER
Ralph H. Ostergren, Fullerton, Calif., assignor to Northrop Corporation, Hawthorne, Calif., a corporation of California
Filed Jan. 5, 1954, Ser. No. 402,210
19 Claims. (Cl. 250—203)

The present invention relates to light trackers, and more particularly, to a novel means for scanning a field of view, said means being especially useful in a tracking system for continuously detecting image deviations from a null, although not limited to this use.

In star tracking systems, a telescope or the like is used to focus the light from a star into an image deviation detector in order that the detector be able to detect a movement of the image away from a control position. The detector output is then used to initiate operation of a servo system connected to the telescope, to return the tracking axis to star sight alignment, thereby centering the image again at the control position.

Several types of scanning means have been used at the focal plane of the star image in the tracker, for transmission of a pulsating light signal to a phototube in such a manner that the phase of the light signal is representative of the direction of error from the center of the field. Such a scanner may be a rotating disc having a desired light transmitting pattern therethrough.

With the scanners used heretofore, however, several problems and difficulties are present which prevent daytime star tracking operation. The main problem is obviously that it is much harder to separate and distinguish a daytime star signal from the bright sky background than compared to night tracking operation. Background includes the average sky gradient, undesired reflections, spurious signals frequently called noise, and so forth.

It is thus an object of this invention to provide a scanner which is sufficiently sensitive and has a high enough signal-to-noise ratio to operate in a daytime star tracker.

A mode definite object of the present invention is to provide a scanner which permits only a very small spot of light to be passed to the phototube or other control device acting upon the same, and which causes spot scanning of the entire field of view.

Another object is to provide a scanner as referred to above, while reducing the normal required exit pupil size, and hence simplifying accompanying optical components.

Other objects and advantages will be apparent upon considering a detailed embodiment to be described subsequently in the specification.

Briefly, my invention comprises a planetary type disc or wheel having a ring of holes near its circumference and rotating about a center which simultaneously describes a circular path around the center of a rotating scanner having a slot-like light transmitting portion carried therewith. This apparatus is located at the focal plane of a tracker optical system, for example, and in front of a photoelectric cell. The parts are preferably arranged and located to cause a series of radial scanning paths swept around a point at the center of the field. Various hole and slot patterns can be employed to give various field coverage patterns and various ratios of scanner rotation to entire field coverage. In other words, scanner speed and "frame" speed need not be limited to any single relation.

In an improved embodiment, a flat inclined glass plate is rotated with the scanner, between it and the light source, and the slot or light transmitting portion of the scanner is relocated accordingly, to allow relative reduction of the size of the desired optical parts used to direct the light signal onto the photo-electric cell.

The invention may be more fully understood by reference to the following detailed description of specific embodiments and to the accompanying drawings thereof.

Figure 1:
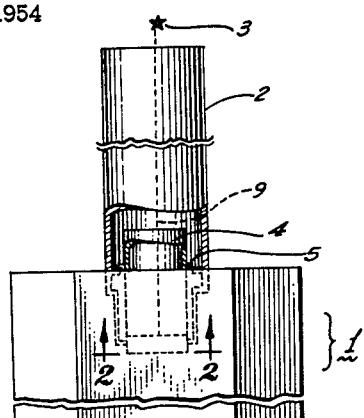
FIGURE 1 is a diagrammatic view of a tracking apparatus, showing the location of the present invention at the base of the telescope.

Referring first to FIGURE 1, a light tracking system 1 contains a telescope 2 for training on a star 3, for example. The telescope 2 carries a rotating hollow-shaft scanner motor 4 in bearings 5 near the inner end of the telescope tube. The present invention does not concern the servo apparatus for moving the telescope about two axes, although such apparatus is usually part of the overall tracking system 1.

Figure 2:
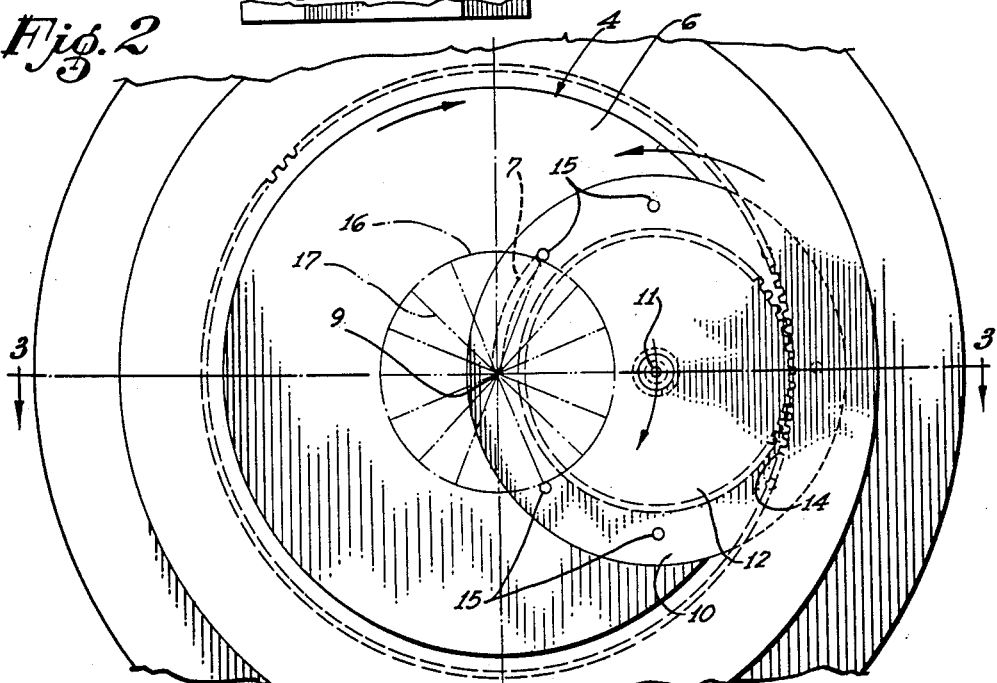
FIGURE 2 is an end view of the scanner looking outwardly from the base of the telescope as indicated by the line 2—2 in FIGURE 1.
Figure 3:
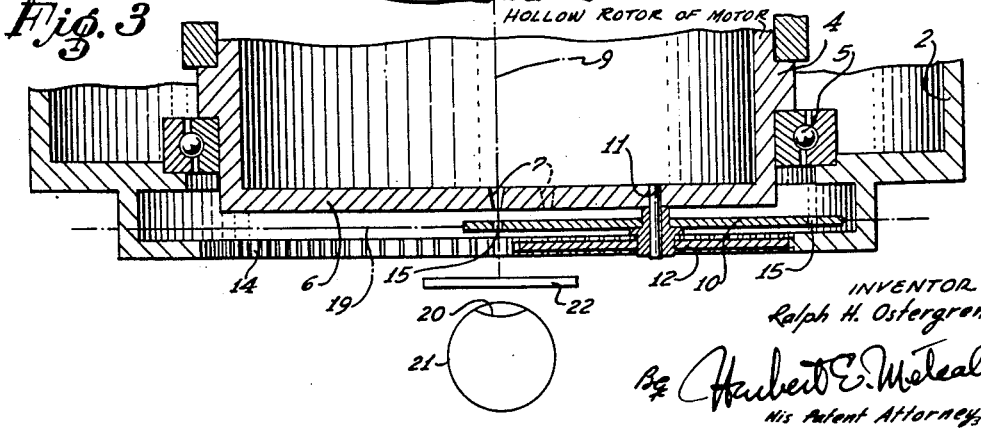
FIGURE 3 is a sectional view of the scanner components taken as indicated by the line 3—3 in FIGURE 2, and additionally showing the phototube located back of the scanner.

As shown in FIGURES 2 and 3, the scanner motor 4 has a solid lower end disk 6 containing a slotted window 7. The window 7 is curved and has one end thereof located directly at the center of the disk 6. This center is also on the optical axis 9 of the telescope 2. A scanner wheel 10 is rotatably mounted back of the motor 4 on a wheel shaft 11 secured at a desired location on the disk 6 between the center and the outside of the scanner motor 4. The wheel 10 is driven by a gear 12, for example, fixed with the wheel and mating with a peripheral ring gear 14 fixed to the telescope 2, so that the wheel 10 rotates relative to the scanner motor 4 at the same time as traveling a circular path around the optical axis 9.

The scanner wheel 10 carries a circular row of holes 15 near the wheel's circumference. Holes 15 are regularly spaced at predetermined intervals and are radially located to always cross the optical axis 9 as the wheel 10 revolves.

As the scanner motor 4 rotates in the direction shown by the arrows in FIGURE 2, the setting of the drive gear 12 relative to the ring gear 14 is such that each hole 15, one by one, coincides with the window 7 along a radial path from the outer end of the window to the center of the field area. A circular field 16 is thus swept by the scanner. In one preferred embodiment, the distance between centers of the holes is exactly equal to the length of the window 7, so that no increase or decrease of light occurs from the background. Scan paths 17 in FIGURE 2 illustrate the principle of this radial scanning. These scan paths 17 might be curved a small amount in actual practice.

Light from the point source to be tracked is focused by the telescope at a focal plane 19 preferably located in coincidence with the scanner wheel 10. After passing through the scan holes 15, the light signal is directed onto the cathode 20 of a phototube 21. A collimator 22 is preferably placed between the phototube 21 and scanner to direct the signal on substantially the same spot of the phototube cathode 20 regardless of image deviation. Phototube 21 is electrically connected to the servo control system (not shown) which responds to the phase of the light signal, relative to scanner motor angle, to accomplish automatic and continuous tracking of the star 3.

It is thus seen that a radial scanning operation is performed, each scan line proceeding from the edge of the field to the center, and successive radial scan lines (like spokes of a wheel) progressing around the field. The width of the window 7 is equal to the diameter of the holes 15, and this dimension is small enough to give a scanning area substantially equal to the area of the star image at the disk 6 and wheel 10.

Figure 4:
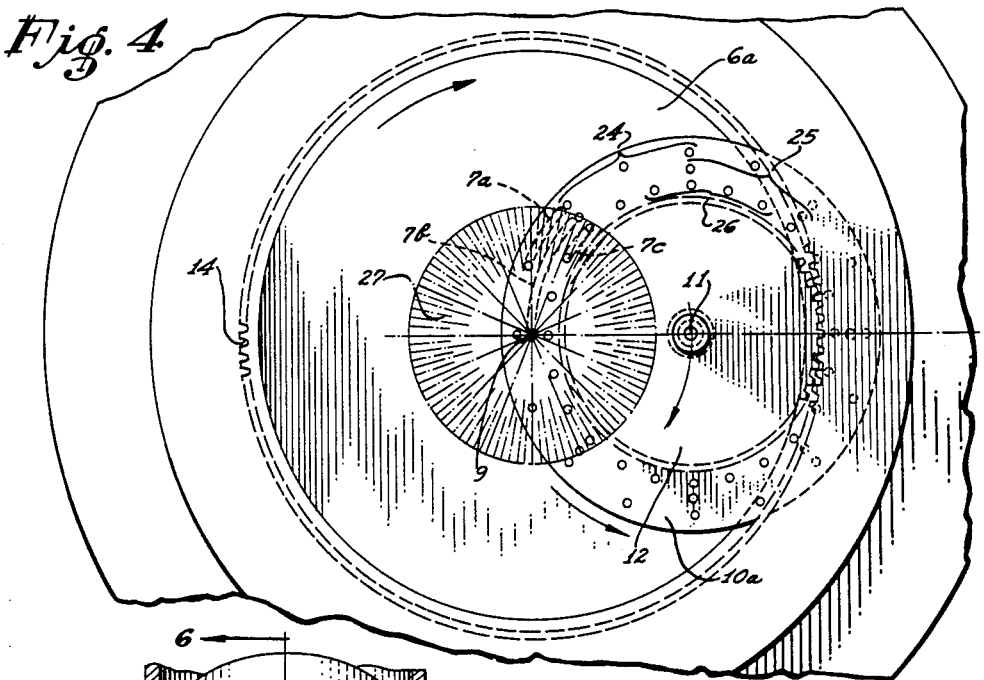
FIGURE 4 is a diagrammatic end view similar to FIGURE 2, showing an example of the present invention which uses a plurality of windows and hole rows for increasing the coverage of the scanner at points approaching the edge of the field.

More than one window, associated with more than one row of holes, may be used, or the number of holes per row can be any suitable number. FIGURE 4 shows one example of how this latter type of arrangement can be accomplished to advantage. Scanner wheel 10a carries three rows of holes 24, 25 and 26, the holes of different rows being differently spaced. Scanner disk 6a is provided with three windows 7a, 7b and 7c, wherein each window is in line with a different hole row and has a length equal to the spacing of the holes in its corresponding row. Phantom lines 27 in the field of view in this figure illustrate the approximate actual scanning pattern produced by the hole and window arrangement shown, as the scanner rotates in the same manner as the device in FIGURES 2 and 3. It is obvious that the plural hole and window arrangement gives effectively 100% field coverage without crowding or inaccuracies at the central control point.

By proper design of scanner wheel proportions and wheel speed, it is possible, if desired, to scan only a fraction of the total field area within the period of one scanner motor revolution, by spacing the scan paths 17 or 27 much winder than the diameter of the holes 15 such that subsequent scanner revolutions allows the spoke pattern to drift around (precess) and eventually scan the entire field 16 in a period consisting of several rotations. The image of a star near the axis of the telescope 2 is then scanned more often than one farther from the center, such that the amount of information about star position is greater near the axis of the system where it is desired to keep the star by servo action, in order to maintain overall accuracy.

Figure 5:
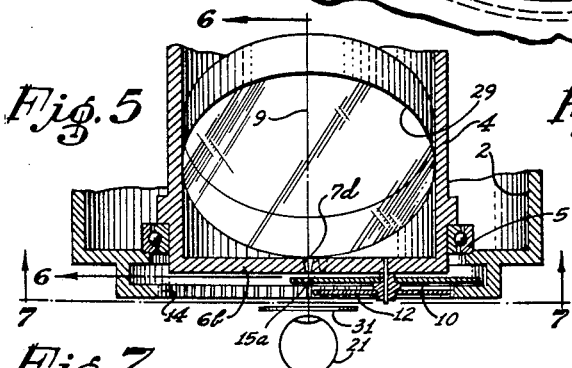
FIGURE 5 is a sectional view similar to FIGURE 3, showing a slightly different embodiment of the present scanner for the purpose of reducing the necessary size of certain optical and photo-electric components.
Figure 6:
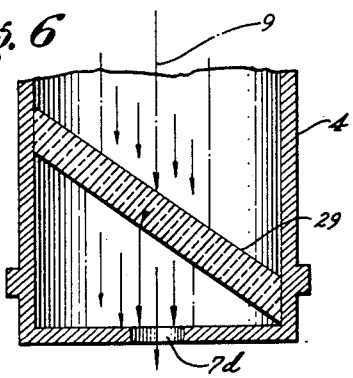
FIGURE 6 is a sectional view of the scanner of FIGURE 5, taken as indicated by line 6—6 in FIGURE 5, showing the inclination of a glass plate component.
Figure 7:
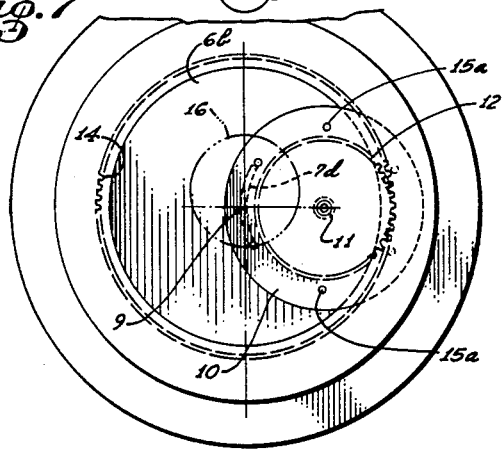
FIGURE 7 is an end view of the modified scanner viewed as indicated by line 7—7 in FIGURE 5.

An improvement of the foregoing system is shown in FIGURES 5, 6, and 7. Here, a flat, relatively thick inclined glass plate 29 is fixed within the scanner motor 4 and rotates with the motor, just ahead of the disk 6b. This acts to deflect, or "detour" the path of all light rays through the glass plate 29 by a constant deviation. Rays from the glass plate 29 to the window 7d are thus still parallel to the optical axis 9 but have a circular motion as the scanner motor 4 rotates. The window 7d is translated by an amount equal to this deviation to a new position where the center of window 7d is on the center of rotation of the scanner disk 6b.

Figure 8:
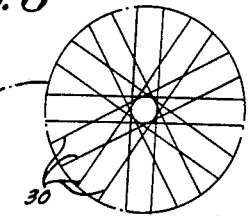
FIGURE 8 is an enlarged diagram showing the actual scanning paths presented to the photocell in the system of FIGURES 5, 6, and 7.

It can be seen from FIGURES 5 and 6 that the scanning of the translated field by holes 15a is in a radial pattern toward the center of the field, the same as done by the device of FIGURES 2 and 3. It follows that the paths of actual scanning lines from the disk 6b toward the phototube 21 form a pattern of lines 30 as shown in FIGURE 8. A collecting or relay lens 31 may be used, or the latter light deviation system (employing the inclined plate 29 or a prism) can be used to move all parts of the scanner window off the center of rotation of the scanner disk, and thus permit the design and use of a Schmidt type spherical reflector collimator (not shown) collecting light and reflecting the same onto a small cathode of the phototube.

Since the window 7d sweeps through a circle only half the size of that which window 7 in FIGURE 2 does, assuming the same window length, an exit pupil size of only one-half is required with the glass plate embodiment of FIGURES 5, 6, and 7. Therefore, the collimating lenses, phototube cathode, and the like, can be made smaller and more efficient. This is of advantage in reducing the thermal noise of the phototube.

It is thus seen that a new and useful low noise, daytime star tracker can be obtained by the provision of the present scanner, which makes it possible to reduce the amount of background sky light to essentially the value in a focal plane area equal to that of the star image. Obviously, many mechanical modifications and changes in form of the present apparatus may be made without departing from the spirit of the invention. For instance, the scanner wheel 10 may be driven by a rubber-tired pulley rolling along a smooth track instead of through gear teeth as shown herein.

While in order to comply with the statute, the invention has been described in language more or less specific as to structural features, it is to be understood that the invention is not limited to the specific features shown, but that the means and construction herein disclosed comprise preferred forms of putting the invention into effect, and the invention is therefore claimed in any of its forms or modifications within the legitimate and valid scope of the appended claims.

What is claimed is:

1. A scanner comprising a disk rotatable about a central axis, said disk having a light transmitting slot with one end of said slot coincident with said axis and the other end extending generally radially away from said axis, an axle mounted on said disk farther from said axis than said other end of said slot, a wheel rotatable on said axle parallel and adjacent to said disk, said wheel having a circular row of small scanning holes therein and spaced from said axle a distance equal to that between said axis and said axle, a circular drive race coaxial with said disk, and driving means cooperating between said drive race and said wheel for rotating said wheel about said axle as said disk rotates about said axis.

2. A scanner comprising a disk rotatable about a central axis, said disk having a narrow elongated light transmitting portion therein, a wheel rotatably mounted on said disk, the center of revolution of said wheel being fixed on said disk at a point between the edge of said disk and said axis, said wheel having a plurality of small holes therethrough arranged to successively pass over said light transmitting portion, and means for simultaneously rotating said wheel about said center and said disk about said axis at a fixed speed ratio, whereby said holes and light transmitting portion trace out a predetermined scanning pattern as said scanner rotates.

3. Apparatus in accordance with claim 2 wherein said light transmitting portion is an arcuate window having its center of arc at said wheel center and one end of said window positioned at said axis, and wherein said holes are located to pass across said axis as said wheel rotates.

4. Apparatus in accordance with claim 2 wherein said light transmitting portion is an arcuate window having its center of arc at said wheel center and its mid-point positioned at said axis, and wherein said holes are located to cross said axis as said wheel rotates.

5. Apparatus in accordance with claim 2 wherein said rotating means comprises a motor drivingly connected to said disk, a ring member surrounding said disk and secured relative to the stator of said motor, and a drive element coaxially fixed with said wheel, said drive element mating with the interior of said ring member whereby said wheel is driven as a planetary wheel when said disk is rotating.

6. Apparatus in accordance with claim 2 including a flat light transmitting plate fixed with respect to said disk and extending at an inclination across said light transmitting portion of said disk.

7. Apparatus in accordance with claim 6 wherein said light transmitting portion of said disk is an arcuate window having its center of arc at said wheel center and its midpoint positioned at said axis.

8. A scanner comprising a rotatable disk of non light transmitting material, two parallel and closely adjacent arcuate light-transmitting windows in said disk pointing substantially toward the central axis of disk rotation, a wheel rotatably mounted on said disk substantially at the center of arc of said windows, two circular rows of holes in said wheel each radially positioned about the rotational center of said wheel at a distance to correspond respectively with said windows, and means for simultaneously rotating said wheel about said center and said disk about said axis at a fixed speed ratio, one of said windows intersecting said disk axis and being longer than the other window, said other window having its inner end spaced outwardly from said disk axis on the same side thereof as its outer end, and the holes in said rows respectively spaced apart by distances equalling the length of their corresponding window.

9. In a light tracking apparatus, the combination of means for focusing an image of a light source to be tracked, a rotatable disk substantially at the local plane of said focusing means, narrow elongated light-transmitting window means in said disk, moving apertured means driven by said disk in an overlapping planetary fashion around the center of said disk to successively pass the apertures therein in alignment with said window means, light-responsive means positioned on the opposite side of said disk from said light source, and means for directing image light passing through said apertures and window means onto said light-responsive means.

10. In a light tracking apparatus having means for focusing an image of a point light source to be tracked, and light-responsive means for initiating error signals; radial scanning means located at the focal plane of said focusing means and comprising an opaque disk rotatable about the optical axis of said focusing means, arcuate light-transmitting means in said disk intersecting said axis, a scanning wheel rotatably mounted on said disk at the center of arc of said light-transmitting means, a plurality of scanning apertures arranged in a circle on said wheel at a distance from said center equal to the distance of said center from said axis, means for simultaneously driving said wheel about said center and said disk about said axis at a fixed speed ratio, and means for directing image light from said scanning means to said light responsive means.

11. Apparatus in accordance with claim 10 wherein said arcuate light-transmitting means comprises a narrow window having its inner end coincident with said optical axis.

12. Apparatus in accordance with claim 10 wherein said arcuate light-transmitting means comprises a narrow window having its mid-point coincident with said optical axis.

13. Apparatus in accordance with claim 10 including means for continuously displacing the field of view presented to said disk, in a circular direction at disk speed.

14. Apparatus in accordance with claim 10 including a flat relatively thick light-transmitting plate fixed with respect to said disk, between said disk and said light source, and extending at an inclination across said light-transmitting means of said disk, and wherein said light-transmitting means is a narrow window having its midpoint coincident with said optical axis.

15. Apparatus in accordance with claim 10 wherein said driving means comprises a stationary ring member, positive motion transmitting means between said ring member and said wheel, and means for rotating said disk.

16. Apparatus in accordance with claim 10 wherein said driving means comprises a motor having a hollow-shaft rotor, said disk being secured to said rotor, an annular ring member coaxial with said rotor and fixed with respect to the stator of said motor, inner surface driving means on said ring member, and circular driven means secured with said wheel and mating with said driving means, whereby said disk is driven in a predetermined planetary revolving fashion about said axis as said motor and disk rotate.

17. In a light tracking apparatus having means for focusing an image of a light source to be tracked, and light-responsive means for initiating error signals; scanning means located at the focal plane of said focusing means and comprising an opaque disk rotatable about the optical axis of said focusing means, a first narrow, arcuate light-transmitting window in said disk intersecting said axis, a second arcuate light-transmitting window in said disk closely adjacent, substantially parallel to, and shorter than said first window, the inner end of said second window being located substantially outwardly from said axis and on the same side thereof as its outer end, a scanner wheel rotatably mounted on said disk at a point which is substantially the center of arc of said first window, a first circular row of holes in said wheel equally spaced from each other by the length of said first window and at a radial distance from said wheel center equal to the distance of said center from said axis, a second circular row of holes in said wheel equally spaced from each other by the length of said second window and at a radial distance from said center equal to the radius of curvature of said second window, means for simultaneously rotating said wheel about said center and said disk about said axis at a fixed speed ratio such that said rows of holes sweep respectively along the lengths of said windows, and means for directing light from said scanning means to said light-responsive means.

18. A radial scanner for a substantially point source of light, comprising: a rotatable disk having a narrow arcuate light-transmission portion therein intersecting the axis of rotation, a scanner wheel rotatably mounted on said disk at the center of arc of said light-transmitting portion and immediately adjacent said disk, a circular row of holes in said wheel at a radius from said center equal to the radius of said arcuate portion, a drive wheel coaxially fixed with said scanner wheel, and a stationary ring member coaxial with said disk, said ring member having a drive race facing centrally in mating and non-slipping contact with the rim of said drive wheel.

19. Apparatus in accordance with claim 18 wherein the width of said light-transmitting portion and the diameter of each of said holes is substantially equal to the extent of a focused image of said light source.

No references cited.